Jan. 6, 1942.   A. E. HERRING   2,269,309
MULTIPLE AIRSCREW DRIVE
Filed Oct. 2, 1939

Inventor
Albert Everard Herring
by B. Singer
his Attorney

Patented Jan. 6, 1942

2,269,309

UNITED STATES PATENT OFFICE 2,269,309

MULTIPLE AIRSCREW DRIVE

Albert Everard Herring, Batlow, Australia

Application October 2, 1939, Serial No. 297,437
In Australia February 14, 1939

1 Claim. (Cl. 170—135.5)

This invention relates to airscrews, and particularly to two co-axial airscrews driven from one engine.

The object of the invention is to provide an improved drive from the one engine to two contra-rotating airscrews mounted co-axially on the engine. The drive is simple and robust, and also permits the use of controllable pitch mechanism for at least one of the two airscrews. The drive does not necessitate any additional shafting, as it is derived from the conventional airscrew shaft of the engine, and it requires but slight modifications to the engine casing itself.

According to the invention the driving gear of the second airscrew is disposed within the hub of the airscrew. Thereby the unsupported length of the airscrew shaft and the distances of the airscrews from the engine are reduced. The rigidity of the double airscrew drive is accordingly increased.

Figure 1:
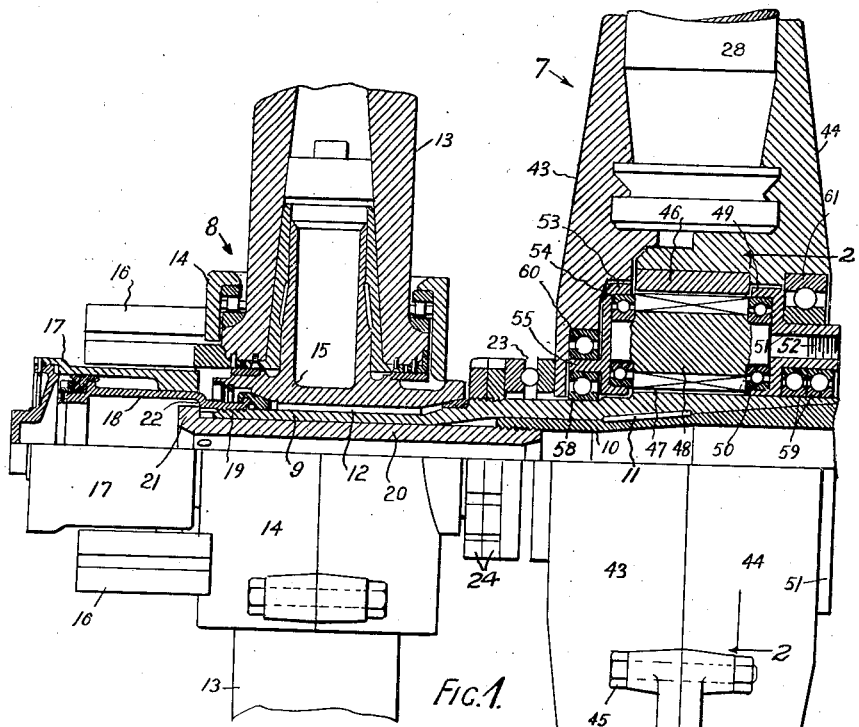
Figure 2:
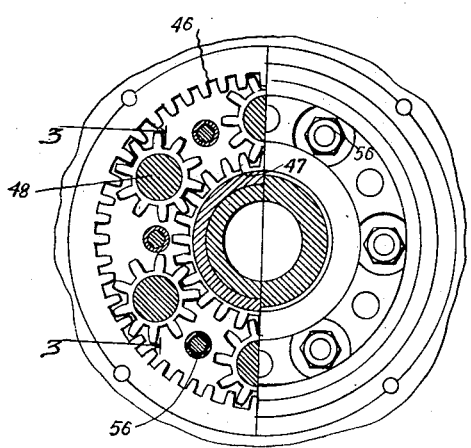
Figure 3:
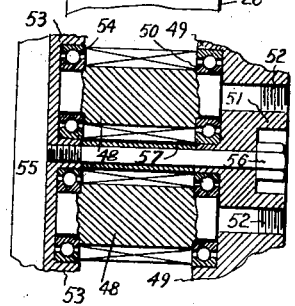

In order to fully describe the invention reference is made to the accompanying drawing which depicts a preferred embodiment thereof, and in which Fig. 1 is a longitudinal elevation, with the upper half in cross-section, of the two co-axial airscrews and the drive therefor, Fig. 2 is an end view of the gear housing of Fig. 1, one half being a cross-section taken on line 2—2 of Fig. 1, Fig. 3 is a cross-sectional view on line 3—3 of Fig. 2.

The invention illustrated comprises one airscrew of fixed pitch, denoted generally by numeral 7, and one airscrew of variable pitch, denoted generally by numeral 8. The particular mechanism for controlling the pitch of airscrew 8 does not form part of this invention, and for the purposes of example the drawing illustrates the standard "Hamilton" pitch control mechanism, which is commonly in use.

As seen in Fig. 1, an extension sleeve 9 is slipped over the standard airscrew shaft 10, with the splines 11 of which it engages to rotate with the airscrew shaft. The outer end of sleeve 9 is formed with splines 12, on which the variable pitch airscrew 8 is mounted. The major parts of this standard airscrew comprise blades 13, 13 mounted in barrel 14 and engaged by spider 15 which is engaged over splines 12 on the sleeve, and counterweights 16, 16 mounted on cylinder 17 which is slidable on piston 18. The piston 18 is engaged through a thread 19 with the outer end of extension sleeve 9, and it is locked in place on this sleeve, and the sleeve is locked on airscrew shaft 10, by means of a locking tube 20 which is threaded into the outer end of airscrew shaft 10 and which is formed with a collar 21 which engages a shoulder 22 on the piston 18.

The fixed pitch airscrew 7 comprises a split hub having a front section 43 and a rear section 44 united by bolts 45, 45 to form a complete structure which carries the metal blades 28. The hub section 43 bears against a thrust race 23 mounted on sleeve 9 and retained in place by lock rings 24, 24 screwed onto the sleeve.

An internal annular driven gear ring 46 is mounted in hub section 44, and an annular driving gear ring 47 is formed on sleeve 9 in register with the driven gear ring. Rotation, in the opposite sense, is transmitted from gear ring 47 to gear ring 46 by a series of similar idler pinions 48, 48 mounted in a fixed cage. The cage comprises two annular sections disposed about the sleeve 9 and secured together as a unit. The rear section 49 carries the rear ball races 50, 50 for the pinions 48, 48 and is formed with a mid flange 51 which is secured to the engine by studs engaged in spaced threaded bores 52, 52 in the flange. The front section 53 of the cage carries the front ball races 54, 54 for the pinions 48, and is formed with an external flange 55. The two sections of the cage are joined as a unit by studs 56, 56 (Figs. 2 and 3) passing through the rear section 49 between the pinions, through distance tubes 57, 57, and threaded into the front section 53.

The cage being affixed to the engine, the sleeve 9 rotates within it in a ball race 58 under front cage flange 55, and a double ball race 59 under rear cage flange 51. The airscrew hub rotates about the cage on a front ball race 60 mounted on front cage flange 55 and a rear ball race 61 mounted on rear cage flange 51.

In operation, the front airscrew 8 rotates with the airscrew shaft 10 and sleeve 9. The rear airscrew 7 is rotated in the opposite sense to the front airscrew by the drive from gear ring 47 transmitted by idler pinions 48 to the hub gear ring 46.

The invention provides a compact and robust drive by means of which two-co-axial airscrews may be rotated in opposite senses from a single engine. The only modification required to a standard engine in fitting the drive is the provision of simple means for securing thereto the cage of the idler pinions.

I claim:

A drive from a single engine for co-axial and contra-rotating airscrews, comprising a first airscrew mounted on the airscrew shaft of the engine for rotation therewith, a second airscrew mounted about said shaft between the first airscrew and the engine and adapted to rotate about said shaft in the opposite sense to the first airscrew, and a gear drive for said second airscrew comprising an annular gear ring rotating with the airscrew shaft and driving, in the opposite sense and through a plurality of idler pinions mounted in a cage affixed to the engine and disposed within the hub of the second airscrew, an annular internal gear ring mounted in the said hub, ball races within said cage for rotatably supporting said first airscrew shaft and ball races on the outside of said cage for supporting said second airscrew shaft.

ALBERT EVERARD HERRING.